United States Patent [19]
Lange

[11] 3,788,195
[45] Jan. 29, 1974

[54] CONTROL VALVE ASSEMBLY FOR A PNEUMATICALLY OPERATED STAPLER

[75] Inventor: Wilfried Lange, Altenhagen, Germany

[73] Assignee: Bukama GmbH, Hannover, Germany

[22] Filed: Sept. 5, 1972

[21] Appl. No.: 286,335

[30] Foreign Application Priority Data
Sept. 10, 1971 Germany.................. P 21 45 302.1

[52] U.S. Cl...................... 91/457, 91/461, 227/130, 251/DIG. 1
[51] Int. Cl...................... F15b 11/08, F15b 13/042
[58] Field of Search..... 91/418, 457, 454, 461, 304; 251/25, DIG. 1; 227/130

[56] References Cited
UNITED STATES PATENTS
3,304,872   2/1967   English........................... 137/525 X
3,392,632   7/1968   Volkmann........................... 91/457
3,680,582   8/1972   Pauliukonis................... 251/DIG. 1

FOREIGN PATENTS OR APPLICATIONS
1,125,604   7/1956   France........................... 251/DIG. 1

Primary Examiner—Irwin C. Cohen
Attorney, Agent, or Firm—Hibben, Noyes & Bicknell

[57] ABSTRACT

An annular chamber of the control valve of a pneumatically operated stapler communicates with a compressed air admission channel and contains an elastic O-ring which is deformable in a radial direction. The outer edge of this O-ring constitutes a control pressure zone which can be affected by an auxiliary valve, and the interior edge of said O-ring is a sealing element for the air admission channel.

10 Claims, 3 Drawing Figures

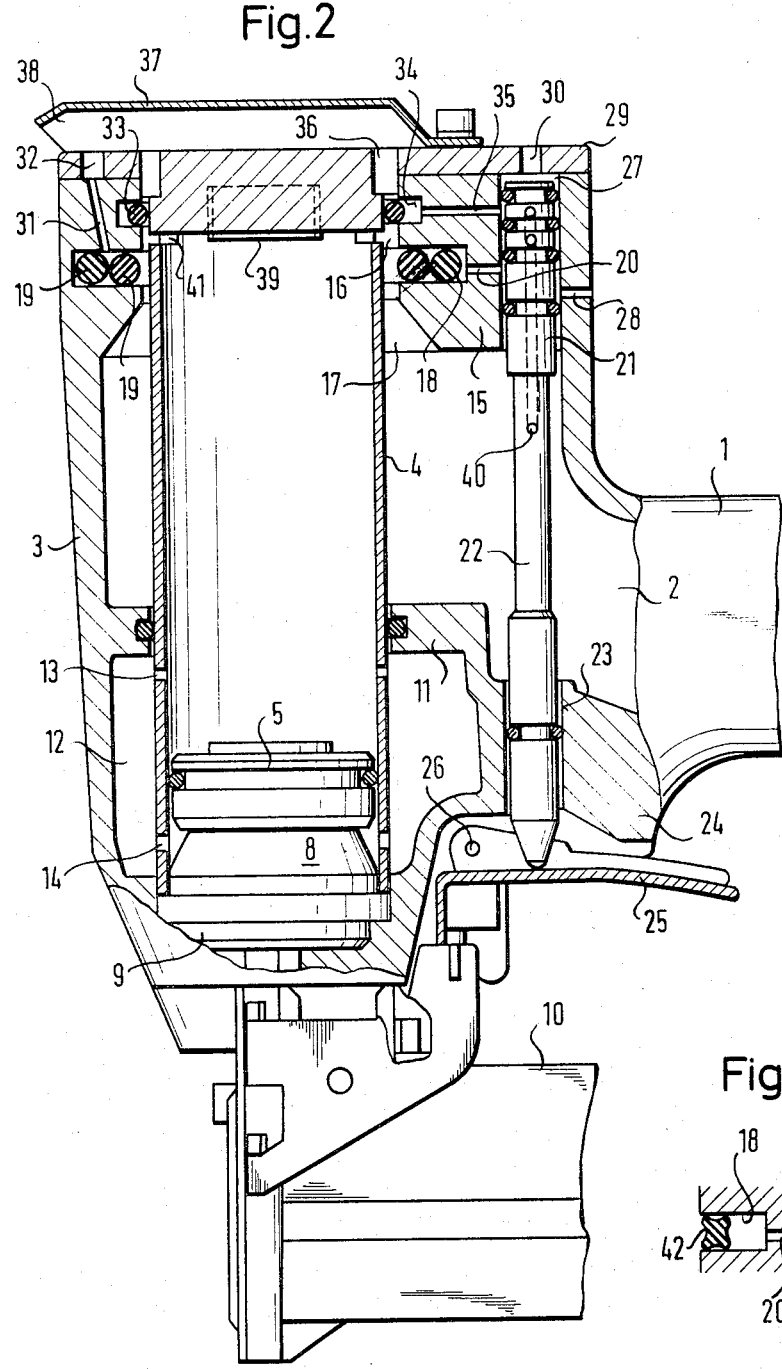

CONTROL VALVE ASSEMBLY FOR A PNEUMATICALLY OPERATED STAPLER

DESCRIPTION

The present invention relates to a control valve assembly of a pneumatically operated fastener device for driving staples, nails and other fastening means into a work piece.

A pneumatically operated fastener device has an inlet valve which supplies compressed air to a working cylinder of the device and an outlet valve which evacuates the expanded air to the atmosphere. It is known in the art to control these valves by means of an auxiliary valve actuated by a trigger lever. The inlet valve and outlet valve often comprise a piston reciprocated axially by the compressed air. The piston blocks or permits the admission of compressed air to the working cylinder and causes its venting. The use of a piston type valve reciprocating in an axial direction necessitates exact finishing or machining of its sealing surfaces and increases the structural length of the device. Also, a piston type valve recoils, which can be a disadvantage, particularly in hand-operated devices.

It is an object of the invention to avoid the disadvantages of the prior piston type valve assemblies. Another object is to reduce the expenditure of work needed to manufacture the valve assemblies. A further object is to provide a control valve assembly which operates without recoil. Still another object is the provision of a valve assembly which has a shorter structural length than the prior valve assemblies.

A valve assembly of the present invention comprises one or more resilient rings which are deformable in a radial direction, the rings being located in an annular valve chamber connected to a compressed air supply channel. The external edges of the rings have control pressure areas, and the internal edges constitute sealing elements. The use of the flexible ring avoids the use of an expensive piston type valve and enables opening and closure of the valve without recoil.

A conventional O-ring may be used for the flexible ring. The O-ring can be obtained at low cost, and the valve chamber, which receives said ring, not be exactly finished or machined. Preferably, the aforementioned valve chamber is provided with two O-rings arranged in concentric relationship with one another. It is recommended when using said two concentric O-rings to connect the valve chamber between these two rings to the atmosphere by means of at least one evacuating channel. This construction has the advantage that the valve chamber is sealed by both O-rings at its outer and inner edges.

The elastic sealing ring may also have a cross-shaped section. An advantage of the invention is that the flexible, radially deformable ring in the valve assembly is insensitive to inaccuracies in machining and requires only little controlling air for moving said seal rings such that a rapid succession of strokes of the percussion device is possible.

The invention is described in connection with the drawings in which by way of example two embodiments are illustrated. In the drawings:

FIG. 2 is a partial longitudinal sectional view of the pneumatic stapler at the end of the working stroke of the piston; and FIG. 3 is a fragmentary sectional view showing another embodiment of the sealing ring.

Figure 1:
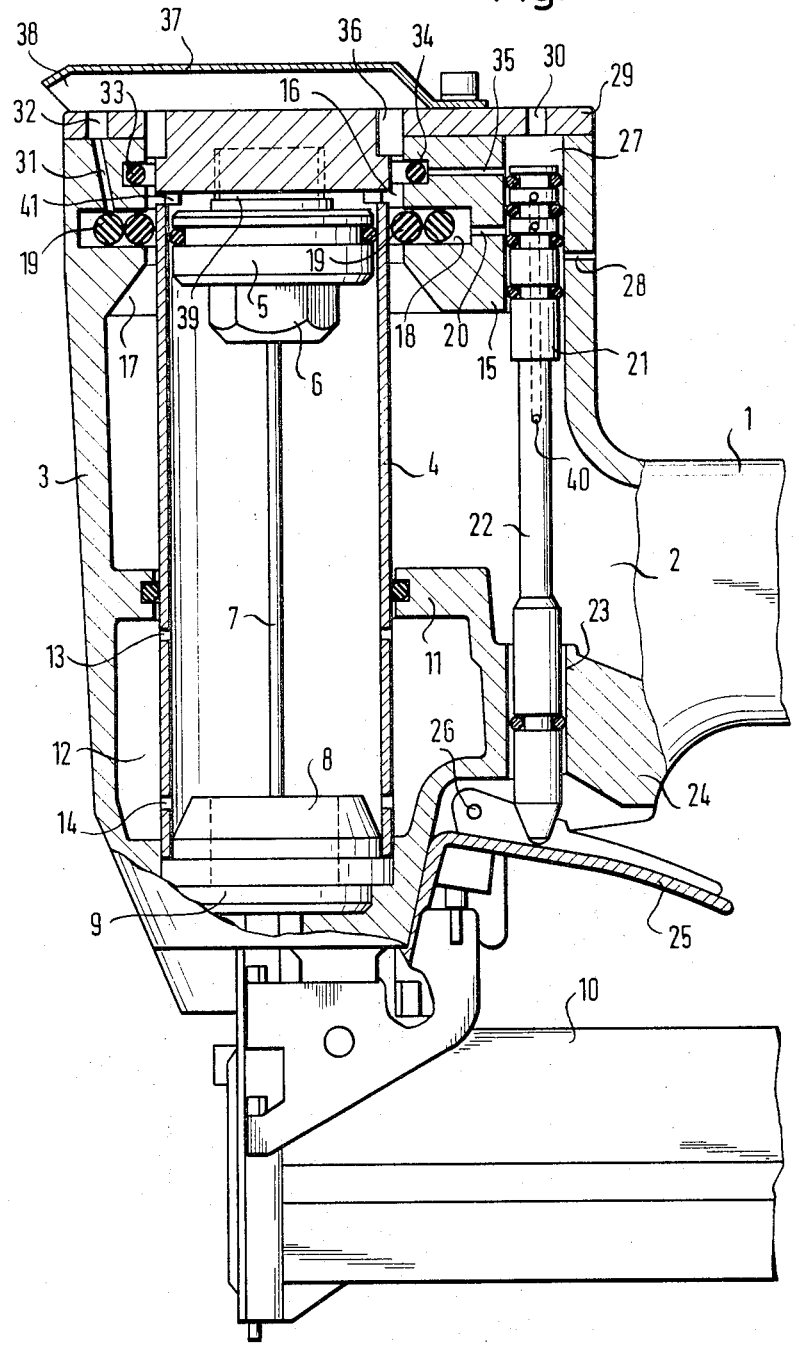
FIG. 1 is a partial longitudinal sectional view of a pneumatic stapler in its initial position.

With reference to FIGS. 1 and 2, a pneumatically operated stapling device comprises a housing 1 constructed in the shape of a handle enclosing a compressed air reservoir 2 which is connected to a compressed air conduit. In its head piece 3 there is contained a working cylinder 4 having a reciprocating piston 5 therein. The piston 5 is provided on its lower side with an extension 6 to which a driving blade 7 is secured. The driving blade 7 passes through a cylinder bottom 9 carrying a flexible annular buffer 8. The driving blade 7, during its working stroke, drives a staple, nail or similar fastener from a magazine 10 into a work piece (not shown).

The compressed air reservoir 2 surrounds the upper portion of the working cylinder 4, and the lower portion is surrounded by an adjacent chamber 12 closed off by an intermediate wall 11, the adjacent chamber communicating with the working cylinder via passages 13 and 14.

The upper end of the working cylinder 4 together with an upper housing portion 15 forms an annular channel 16 communicating, via a funnel-type recess 17, with the compressed air reservoir 2. In the wall of the upper housing portion 15 defining the annular channel 16 there is provided an annular valve chamber 18 housing two concentrically arranged elastic O-rings 19, and the rings are in contact with each other on their adjacent surfaces. The annular chamber 18 communicates via a control channel 20 with an auxiliary valve 21. The valve 21 has a valve stem 22 which passes through the compressed air reservoir 2 and is snugly guided in a bore 23 of a housing portion 24. The lower end of the valve stem 22 abuts a trigger lever 25 to be actuated manually. The lever 25 is pivotally mounted on a stud 26 arranged on the housing portion 24. A bore 27 for the auxiliary valve 21 communicates with the ambient air via an evacuating channel 28 and bore 30 provided in a housing cover 29. The annular valve chamber 18 is, likewise, evacuated via an evacuating channel 31 and a bore 32 in the housing cover 29. A recess 34 containing an elastic O-ring 33 is provided above the annular valve chamber 18. Said recess 34 communicates with the housing bore 27 of the auxiliary valve 21 via a channel 35.

The annular channel 16 enclosing the upper end of the working cylinder 4 communicates with atmospheric air via an indent 36 in the housing cover 29. On the cover 29 a protective cap 37 is secured which together with the cover forms an evacuating channel 38. A magnet 39 is located in the lower side of the housing cover 29 and retains piston 5 in the initial position illustrated in FIG. 1.

In the initial position shown in FIG. 1, the piston 5 is held by the magnet 39 in the housing cover 29, and both O-rings in the valve chamber 18 have their outer edges functioning as a control pressure zone communicating via channel 20, housing bore 27 of auxiliary valve 21 and an axial bore 40 in the valve stem 22 with the compressed air reservoir 2. The air pressure acting on the O-rings urges them inwardly, whereby the annular channel 16 between the working cylinder 4 and the upper housing portion 15 is closed. The O-ring 33 located in the upper indent 34 communicates, via channel 35, housing bore 27 of the auxiliary valve 21 and evacuating bore 30, with the atmosphere. Since the O-ring 33 has no pressure exerted on it, it assumes, consequently, due to its elasticity and flexibility, its largest diameter, thus connecting the annular channel 16 and the upper end of the working cylinder 4, via said annular channel 16, recess 36 and evacuating channel 38, with the ambient air.

In order to initiate a working stroke of the stapling device the trigger lever 25 is pivoted by the operator into the upper position shown in FIG. 2, whereby the valve stem 22 of the auxiliary valve 21 is raised. This leads to interrupting the connection of the control channel 20 of the annular valve chamber 18 with the axial bore 40 and connecting same, via housing bore 27 to the evacuating channel 28, such that both O-rings expand — due to their elasticity and the pressure applied thereon by way of the compressed air supplied from the reservoir 2 — and assume their outermost position in the annular valve chamber 18. Thus the annular chamber 16 is opened, and compressed air from the reservoir 2 passes, via the funnel-shaped channel 17 and the annular channel 16 into the slotted inlet apertures 41 at the upper end of the working cylinder 4 between the housing cover 29 and the upper side of piston 5. As soon as the pressure builds up here — so as to be large enough to overcome the attractive force of the magnet 39, the piston 5 is pressed downwardly, and the driver 7 drives a staple or nail into the work piece. During the working stroke, the upper O-ring 33 assumes the position shown in FIG. 2 since channel 35 communicates, at this instant, with the axial bore 40 of the valve stem 22, and the compressed air from reservoir 2 presently exerts pressure on the outer edge of O-ring 33, compressing said O-ring 33 to close the upper end of the annular channel 16.

When the piston 5 has reached its lower position and the trigger lever 25 of the auxiliary valve 21 has been released, the valve stem 22 moves downwardly back to its initial position. Thus, both O-rings 19 are compressed by the compressed air acting on their outer edges, and O-ring 33 is expanded due to the effect of the evacuating channel 35 and assumes its initial position so that the annular channel 16 communicates with the ambient air, and the piston 5 urged, in a manner well known, in an upward direction on account of the compressed air admitted from the adjoining chamber 12 does not compress the air in cylinder 4.

Evacuation of the annular valve chamber 18 via channel 31 assures thus, that the O-rings 19 may contract unimpededly under the influence of the compressed air acting upon the control pressure zones of the outer O-ring 19 so as to assume their final position. Consequently, no build up of pressure occurs between the O-rings.

As shown in FIG. 3 for example, it is possible to replace both O-rings 19 with a flexible ring 42 of generally cruciform cross section mounted in the annular valve chamber 18. In some cases, in fact, it is sufficient to have but a single O-ring for effectively controlling the compressed air used in driving the percussion device.

Utilization of elastic rings as sealing elements of the valve as provided for by the invention has the further advantage being simple in construction and economical, allowing the rings to be readily replaced. Further, the rings are easily obtained in commerce as well as relatively inexpensive. Another particular advantage resides in the fact that the valve arrangement has no parts which are movable in an axial direction, thus preventing recoil action of the percussion device in response to valve movements.

Changes may be made in the construction and arrangement of the parts of my control valve assembly without departing from the spirit and purpose of my intention, and it is my invention to cover by my claims any modified forms of structure or use of mechanical equivalents which may reasonably be included within their scope.

I claim:

1. A pneumatically actuated stapling device having a working cylinder with an axis thereof, a piston reciprocable in said cylinder, a control valve assembly, a channel for admission of compressed air to said cylinder, and an auxiliary trigger operated valve for controlling the control valve assembly; said control valve assembly comprising an annular valve chamber formed in said device intermediate said cylinder and said air admission channel, and elastic radially deformable ring means disposed in said annular valve chamber radially about said axis, said ring means being radially deformable in response to air pressure supplied from said auxiliary trigger valve to the outer surface of said ring means when said auxiliary valve is in one position, said ring means having an inner surface for closing off the cylinder from said compressed air channel when said auxiliary valve is in said one position.

2. A device according to claim 1, wherein said elastic ring means is of circular cross section.

3. A device according to claim 1, wherein said ring means comprises a plurality of concentric elastic rings mounted in the annular valve chamber, said rings contacting each other.

4. A device according to claim 3, further comprising an evacuation channel located between said elastic rings, said evacuation channel communicating with the ambient air.

5. A device according to claim 1, wherein said elastic ring means is of cross-shaped cross section.

6. In a pneumatically actuated stapling device having a casing, a working cylinder with an axis thereof, an air storage chamber adjacent said working cylinder, a piston slidable in said working cylinder, a manually operable auxiliary valve having two positions, and an annular passage disposed radially about said axis formed between the upper end of the working cylinder and the upper portion of the casing, the annular passage communicating with the air storage chamber and with the atmosphere; an improved control valve assembly located at the upper end of the working cylinder for introducing air under pressure from the air storage chamber to the working cylinder when the auxiliary valve is in one position and exhausting air from the working cylinder when the auxiliary valve is in another position and the piston has completed its working stroke, said control valve assembly comprising an enlarged annular chamber disposed radially about said axis and intermediate the ends of said annular passage, and elastic radially deformable ring valve means housed in said annular chamber to radially expand and contract about said axis to open the working cylinder to and to close off the working cylinder from the air storage chamber, a channel being provided in the device communicating between said annular chamber and the manually operable auxiliary valve for applying air pressure for causing radial movement of said elastic radially deformable ring valve means.

7. A device according to claim 6, wherein the annular passage above the working cylinder is enlarged to form a second annular chamber which encloses a second elastic radially deformable ring valve means for sealing the upper end of the working cylinder from the atmosphere, a passageway connecting said second annular chamber to the manually operable auxiliary valve, the annular passage being closed by said second elastic radially deformable ring valve means when the auxiliary valve is in said one position.

8. A device according to claim 6, wherein said elastic radially deformable ring valve means comprises two concentric rings mounted in said annular chamber and contacting each other.

9. A device according to claim 8, further comprising an evacuation channel located between said rings, said evacuation channel communicating with the atmosphere.

10. A device according to claim 6, wherein said elastic radially deformable ring valve means is a ring having a generally cross-shaped cross section.

* * * * *